US012700816B2

(12) United States Patent　　　　　(10) Patent No.:　US 12,700,816 B2
Li et al.　　　　　　　　　　　　　　(45) Date of Patent:　　　Aug. 4, 2026

(54) POWER TOOL AND CONTROL METHOD THEREOF

(71) Applicant: Nanjing Chervon Industry Co., Ltd., Nanjing (CN)

(72) Inventors: Guang Li, Nanjing (CN); Yanqing Xu, Nanjing (CN); Hailong Wang, Nanjing (CN); Bing Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/060,958

(22) Filed: Feb. 24, 2025

(65) Prior Publication Data

US 2026/0106560 A1　　Apr. 16, 2026

(30) Foreign Application Priority Data

Oct. 12, 2024　(CN) .......................... 202411422383.1
Oct. 12, 2024　(CN) .......................... 202411428260.9

(51) Int. Cl.
　　*H02P 21/16*　　　(2016.01)
　　*B24B 23/02*　　　(2006.01)
　　*B25D 11/06*　　　(2006.01)
　　*B25F 5/00*　　　(2006.01)
　　*H02K 11/33*　　　(2016.01)
　　*H02K 19/10*　　　(2006.01)
　　*H02P 21/18*　　　(2016.01)
　　*H02P 21/22*　　　(2016.01)

(52) U.S. Cl.
　　CPC .............. *H02P 21/16* (2016.02); *B25F 5/001* (2013.01); *H02K 11/33* (2016.01); *H02K 19/10* (2013.01); *H02P 21/18* (2016.02);

*H02P 21/22* (2016.02); *B24B 23/028* (2013.01); *B25D 11/064* (2013.01); *H02P 2207/05* (2013.01)

(58) Field of Classification Search
　　CPC ...... H02P 2207/05; H02P 21/22; H02P 21/18; H02P 21/16
　　See application file for complete search history.

(56) References Cited

U.S. PATENT DOCUMENTS

2012/0274249 A1* 11/2012 Mullin .................... H02P 6/182
　　　　　　　　　　　　　　　　　　318/400.11

FOREIGN PATENT DOCUMENTS

CN　　　　115411977 A　　11/2022
EP　　　　　4207583 A1 *　7/2023 .............. H02P 29/60

* cited by examiner

*Primary Examiner* — Daniel Jeremy Leeds
(74) *Attorney, Agent, or Firm* — Greenberg Traurig, LLP

(57)　　　　　　ABSTRACT

A power tool includes: a functional element; an electric motor including a stator and a rotor and configured to drive the functional element to rotate; a power supply module configured to supply power to the electric motor; a driver circuit electrically connected to the electric motor and the power supply module and configured to apply a voltage of the power supply module to the electric motor; and a controller electrically connected to the driver circuit and configured to output a control signal to the driver circuit. The controller is configured to, when the electric motor is overloaded, adjust a current limit value supplied to the electric motor and control the driver circuit in a first control mode, so as to cause a voltage of the electric motor to vary in a quasi-sine wave with a rotor position of the electric motor.

9 Claims, 5 Drawing Sheets

POWER TOOL AND CONTROL METHOD THEREOF

RELATED APPLICATION INFORMATION

This application claims the benefit under 35 U.S.C. § 119(a) of Chinese Patent Application No. 202411422383.1, filed on Oct. 12, 2024, and Chinese Patent Application No. 202411428260.9, filed on Oct. 12, 2024, which applications are incorporated herein by reference in their entireties.

TECHNICAL FIELD

The present application relates to the field of motor control technologies of power tools and, in particular, to a power tool and a control method thereof.

BACKGROUND

Power tools with brushless motors on the market mostly adopt a square wave control mode with a position sensor or a field-oriented control (FOC) mode. In the event of an overload, an electric motor automatically shuts down within one second of stalling. After the electric motor is unloaded, a user needs to restart the electric motor to continue working. Furthermore, in an electric motor control mode with a position sensor, a rotor position can be accurately detected through the position sensor, but the cost of sensor materials, installation, and maintenance is increased.

When an electric motor with no position sensor rotates at a high speed under square wave control, a rotor position can be accurately detected through estimation. However, when the electric motor is caused to rotate at an extremely low speed in the event of an overload, or even when the electric motor is reversed due to an external force, the rotor position is detected inaccurately. As a result, the electric motor cannot continuously output torque and is prone to stall to automatically shut down.

This part provides background information related to the present application, and the background information is not necessarily the existing art.

SUMMARY

A power tool includes a functional element, an electric motor, a power supply module, a driver circuit, a temperature detection device, and a controller. The electric motor includes a stator and a rotor and is configured to drive the functional element to rotate. The power supply module is configured to supply power to the electric motor. The driver circuit is electrically connected to the electric motor and the power supply module and is configured to apply a voltage of the power supply module to the electric motor. The temperature detection device is configured to detect a temperature inside the power tool. The controller is electrically connected to the driver circuit and is configured to output a control signal to the driver circuit. The controller is configured to perform the operations below.

In some examples, in the case where the temperature is lower than a temperature threshold, the driver circuit is controlled in a third control mode so that a voltage of the electric motor is caused to vary in a third wave with a rotor position of the electric motor.

In some examples, in the case where the temperature is higher than or equal to the temperature threshold, the driver circuit is controlled in a second control mode so that the voltage of the electric motor is caused to vary in a second wave with the rotor position of the electric motor.

In some examples, the third wave includes a square wave, or the third wave includes a wave in which a square wave and a quasi-sine wave appear alternately.

In some examples, the quasi-sine wave includes at least one of a sine wave and a saddle wave.

In some examples, the controller is further configured to, in the case where the temperature is lower than the temperature threshold and a duty cycle of the control signal is less than a duty cycle threshold, control the driver circuit in the second control mode.

In some examples, the controller is further configured to, in the case where the temperature is lower than the temperature threshold and a duty cycle of the control signal is greater than or equal to a duty cycle threshold, control the driver circuit in a first control mode so as to cause the voltage of the electric motor to vary in the quasi-sine wave with the position of the rotor of the electric motor.

In some examples, the electric motor is a sensorless motor.

A power tool includes a functional element, an electric motor, a power supply module, a driver circuit, a temperature detection device, and a controller. The electric motor includes a stator and a rotor and is configured to drive the functional element to rotate. The power supply module is configured to supply power to the electric motor. The driver circuit is electrically connected to the electric motor and the power supply module and is configured to apply a voltage of the power supply module to the electric motor. The temperature detection device is configured to detect a temperature inside the power tool. The controller is electrically connected to the driver circuit and is configured to output a control signal to the driver circuit. The controller is configured to perform the operation below. A control mode in which the driver circuit is controlled is determined according to the temperature and a duty cycle of the control signal so that a voltage of the electric motor is caused to vary with a rotor position of the electric motor in a wave corresponding to the control mode.

In some examples, the controller is further configured to, when the temperature is lower than a temperature threshold, determine, according to the duty cycle, the control mode in which the driver circuit is controlled, so as to cause the voltage of the electric motor to vary with the rotor position of the electric motor in the wave corresponding to the control mode.

In some examples, the controller is further configured to, in the case where the temperature is lower than the temperature threshold and at the time when the duty cycle of the control signal is less than a duty cycle threshold, control the driver circuit in a second control mode.

In some examples, the controller is further configured to, in the case where the temperature is lower than the temperature threshold and at the time when the duty cycle of the control signal is greater than or equal to a duty cycle threshold, control the driver circuit in a first control mode so as to cause the voltage of the electric motor to vary in a quasi-sine wave with the position of the rotor of the electric motor.

In some examples, the temperature includes at least one of the temperature of the electric motor, the temperature of a power element in the driver circuit, and the temperature of a control board in the power tool.

A control method of a power tool is provided. The power tool includes: a functional element; an electric motor including a stator and a rotor and configured to drive the functional element to rotate; a power supply module configured to supply power to the electric motor; a driver circuit electrically connected to the electric motor and the power supply module and configured to apply a voltage of the power supply module to the electric motor; a temperature detection device configured to detect a temperature inside the power tool; and a controller electrically connected to the driver circuit and configured to output a control signal to the driver circuit. The control method includes: in the case where the temperature is higher than or equal to a temperature threshold, controlling the driver circuit in a second control mode so as to cause a voltage of the electric motor to vary in a second wave with a rotor position of the electric motor; and in the case where the temperature is lower than the temperature threshold, controlling the driver circuit in a third control mode so as to cause the voltage of the electric motor to vary in a third wave with the rotor position of the electric motor.

In some examples, the third wave includes a square wave, or the third wave includes a wave in which a square wave and a quasi-sine wave appear alternately.

In some examples, the quasi-sine wave includes at least one of a sine wave and a saddle wave.

In some examples, the control method further includes: in the case where the temperature is lower than the temperature threshold and a duty cycle of the control signal is less than a duty cycle threshold, controlling the driver circuit in the second control mode.

In some examples, the control method further includes: in the case where the temperature is lower than the temperature threshold and a duty cycle of the control signal is greater than or equal to a duty cycle threshold, controlling the driver circuit in a first control mode so as to cause the voltage of the electric motor to vary in the quasi-sine wave with the position of the rotor of the electric motor.

DETAILED DESCRIPTION

Figure 1:
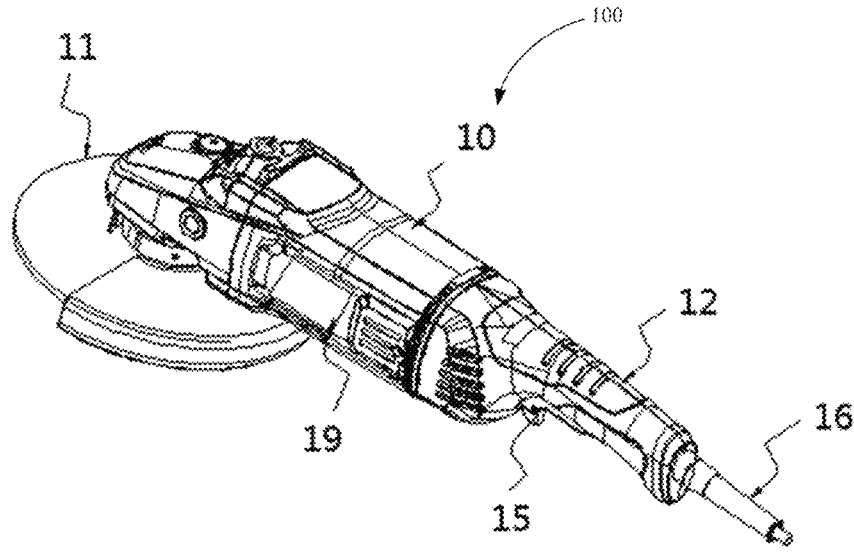
FIG. 1 is a structural view of a power tool according to the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies□one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Power tools to which the technical solutions of the present application are applicable include handheld power tools, fastening power tools, cutting power tools, polishing power tools, garden power tools, and the like. For example, the power tools include an electric drill, an electric circular saw, a reciprocating saw, a miter saw, an impact wrench, an angle grinder, an impact screwdriver, and a hammer anvil. Other types of power tools which can adopt the substance of the technical solutions disclosed below may fall within the scope of the present application. The angle grinder is used as an example for description in the present application, and other types of power tools are not introduced one by one.

Figure 2:
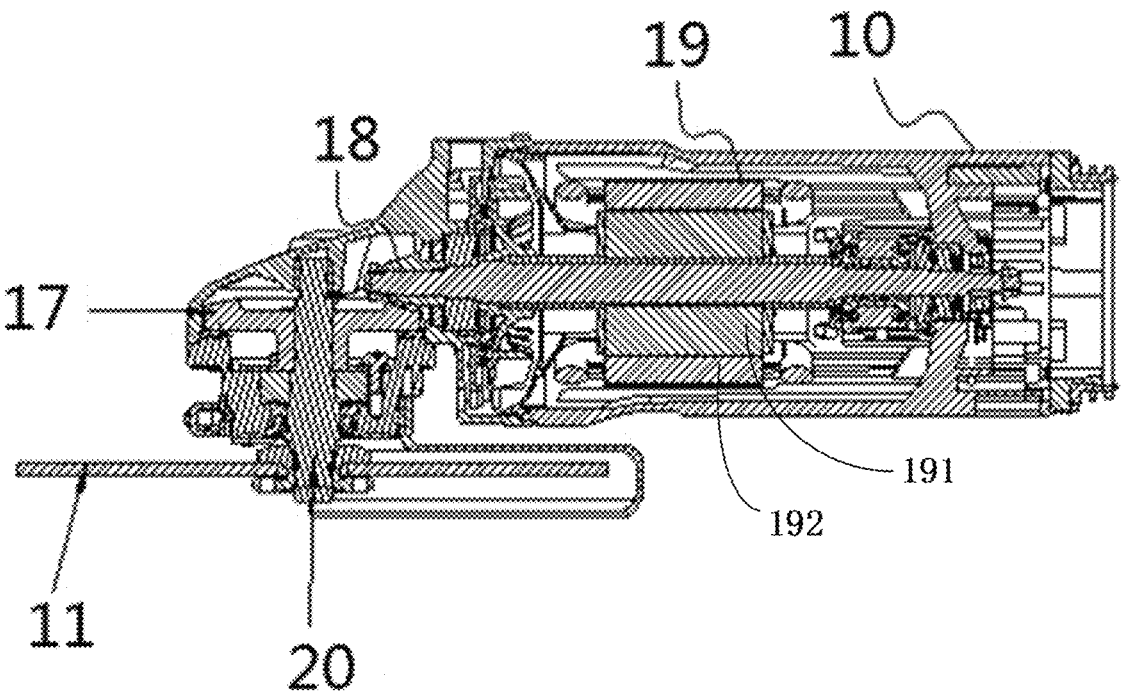
FIG. 2 is another structural view of a power tool according to the present application.

FIG. 1 is a structural view of a power tool according to the present application. FIG. 2 is another structural view of the power tool according to the present application. Referring to FIGS. 1 and 2, the power tool 100 mainly includes a functional element 11, an electric motor 19 including a stator 191 and a rotor 192 and configured to drive the functional element 11 to rotate, and a power supply module configured to supply power to the electric motor 19.

The power tool 100 has a housing 10. The housing 10 is provided with an inner cavity. The electric motor 19 is disposed in the inner cavity. The inner cavity further accommodates a transmission device 17 and other electronic components such as a circuit board. A grip 12 and an operation device 15 may be disposed on the housing 10. The grip 12 is conveniently held by a user. The operation device 15 is used for adjusting the speed of the electric motor 19. The operation device 15 may be, but is not limited to, a trigger, a knob, a sliding mechanism, and the like. In this example, the operation device 15 is configured as a sliding mechanism. The front end of the housing 10 is used for mounting the functional element 11. Depending on the type of power tool, different functional elements 11 may be adopted. The functional element 11 in this example is preferably a grinding disc. That is, the power tool in this example is an angle grinder for implementing a grinding or cutting function. A rotating shaft 18 of the electric motor 19 drives the functional element 11 through the transmission device 17 and an output shaft 20. The functional element 11 may be provided with a shield 16 so as to be protected safely. The power supply module supplies power to the electric motor 19. Preferably, the power supply module is connected to a power supply through a power cord so as to supply power to the electric motor 19.

The electric motor 19 includes the stator 191 and the rotor 192. The electric motor 19 may be a brushless direct current motor and is preferably a sensorless motor (that is, an electric motor without any position sensor). In this example, the electric motor 19 may be an inrunner or an outrunner. Three phases of stator windings A, B, and C of the electric motor 19 may form a star connection or a triangular connection.

Figure 3:
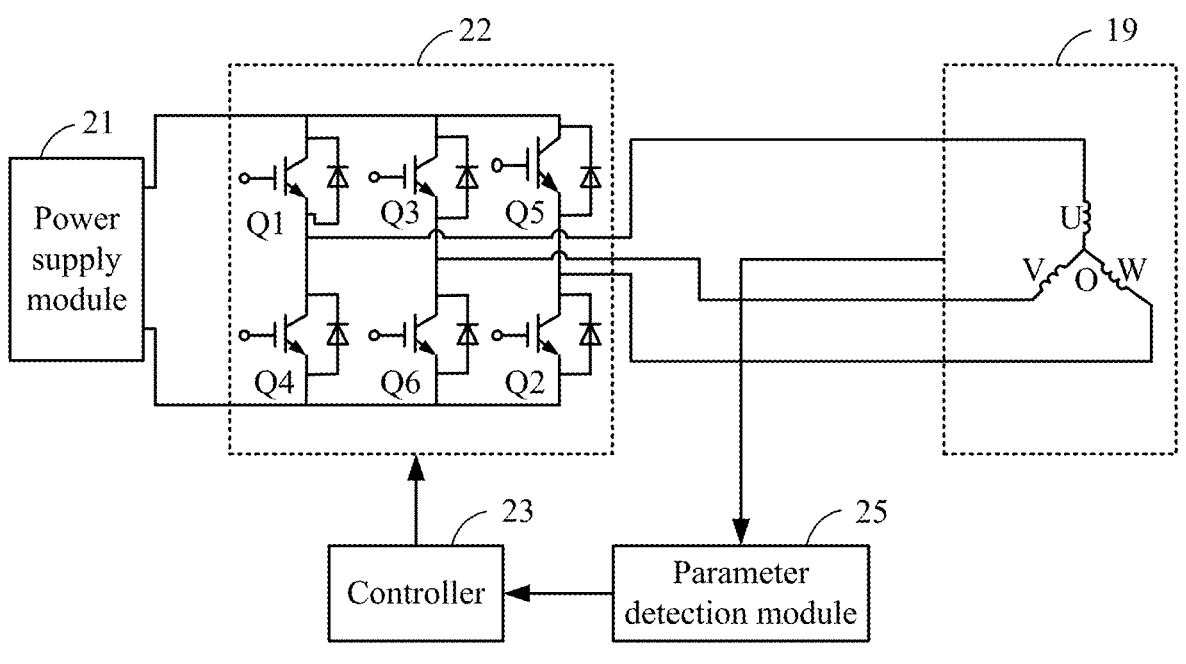
FIG. 3 is a block diagram of circuitry of a power tool according to the present application.

FIG. 3 is a block diagram of circuitry of a power tool according to the present application. As shown in FIG. 3, the power supply module 21 is configured to supply power to the electric motor 19 in the power tool. In an example, a power supply connected to the power supply module 21 may be an alternating current power supply such as utility power of 120 V or 220 V. In this case, the power supply module 21 may include a power conversion unit capable of converting an alternating current into a direct current which can be used by the electric motor 19. In an example, the power supply connected to the power supply module 21 may be a battery pack. In this case, the power supply module 21 can reduce a voltage outputted by the battery pack and output an appropriate voltage to the electric motor so as to supply power to the electric motor 19.

Referring to FIG. 3, the power tool further includes a driver circuit 22 and a controller 23. The driver circuit 22 is electrically connected to the electric motor 19 and the power supply module 21 and is configured to apply the voltage of the power supply module 21 to the electric motor 19. The controller 23 is electrically connected to the driver circuit 22 and is configured to output a control signal to the driver circuit 22.

The driver circuit 22 is electrically connected to the three phases of stator windings A, B, and C of the electric motor 19 and the power supply module 21. The driver circuit 22 is configured to output a drive current to the electric motor 19 according to the power supply voltage outputted by the power supply module 21 so as to drive the electric motor 19 to rotate. In an example, the driver circuit 22 includes multiple switching elements. For example, the driver circuit 22 may include at least six switching elements Q1, Q2, Q3, Q4, Q5, and Q6. Q1, Q3, and Q5 are high-side switching elements, and Q2, Q4, and Q6 are low-side switching elements. Any phase of stator winding of the electric motor 19 is connected to one high-side switching element and one low-side switching element. The gate terminal of each switching element in the driver circuit 22 is electrically connected to the controller 23 and is configured to receive the control signal from the controller 23. The drain or source of each switching element is connected to the stator windings A, B, and C of the electric motor 19. The switching elements Q1 to Q6 change respective conduction states according to the control signal from the controller 23, thereby changing the current applied to the stator windings A, B, and C of the electric motor 19 by the power supply module 21. In an example, the driver circuit 22 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as IGBTs or BJTs.

To drive the electric motor 19 to rotate, the driver circuit 22 has multiple driving states. The electric motor 19 may have different rotational speeds or different rotation directions in different driving states. In an example, the driver circuit 22 typically has at least six driving states, and each switchover between driving states corresponds to one commutation action of the electric motor 19. In an example, the controller 23 may output a pulse-width modulation (PWM)

control signal to control the driver circuit 22 to switch a driving state, thereby changing the working state of the electric motor 19.

The controller 23 may control the driver circuit 22 in various modes including square wave control, FOC, or a combination of the square wave control and the FOC. A control mode for controlling the driver circuit 22 may be selected according to the running condition of the electric motor 19. In an example, the controller 23 is configured to, when the electric motor 19 is overloaded, adjust a current limit value supplied to the electric motor 19 and control the driver circuit 22 in a first control mode, so as to cause a voltage of the electric motor 19 to vary in a quasi-sine wave with a rotor position of the electric motor 19. The overload of the electric motor 19 comprises a stall condition of the electric motor 19. In some example, when the electric motor 19 is overloaded, it means the electric motor 19 is stalled.

In this example, the first control mode is preferably the FOC mode. In the case where the electric motor 19 is overloaded, a current limit value of an operating current of the electric motor 19 may be adjusted so that a current outputted from the driver circuit 22 to the electric motor is adjusted according to the current limit value. Thus, the operating current of the electric motor 19 can rapidly decrease. In addition, the driver circuit 22 may be controlled in the first control mode so that the voltage outputted to the electric motor 19 by each switching element in the driver circuit 22 under the control in the first control mode can vary in a sine wave according to the rotor position. That is, the voltage of the electric motor 19 varies in the quasi-sine wave with the rotor position of the electric motor 19. Thus, in the case where the electric motor 19 is overloaded, the electric motor 19 can maintain low-torque output without shutting down. After the electric motor 19 is unloaded, the user does not need to restart the electric motor 19 by operating a switch. Thus, the user's operational procedures can be reduced, thereby effectively improving user experience.

In an example, in the case where the electric motor 19 is overloaded, the current limit value supplied to the electric motor 19 may first be adjusted. This configuration aims to adjust output torque of the electric motor so that the torque of the electric motor is adapted to a present heavy load and the electric motor does not shut down immediately. Additionally, an overtemperature can be prevented. After the operating current of the electric motor 19 decreases, the driver circuit 22 is controlled in the first control mode so that the voltage of the electric motor 19 can vary in the quasi-sine wave with the rotor position. Accordingly, the electric motor 19 maintains the low-torque output without shutting down in the case of an overload.

In the case where the electric motor is overloaded, the power tool provided in the present application adjusts the current limit value supplied to the electric motor so that the operating current of the electric motor is reduced, and the output torque of the electric motor is adjusted so that the torque of the electric motor is adapted to the present heavy load and the electric motor does not shut down immediately. Additionally, the overtemperature can be prevented. Moreover, the driver circuit is controlled in the first control mode so that the voltage of the electric motor varies in the quasi-sine wave with the rotor position of the electric motor. Accordingly, the electric motor maintains the low-torque output without shutting down in the case of the overload. Thus, the user's operational procedures can be reduced, thereby effectively improving the user experience.

In an example, the quasi-sine wave may include a sine wave or a saddle wave.

Referring to FIG. 1, the power tool further includes a parameter detection device 25 configured to detect an operating parameter of the electric motor 19. The operating parameter includes at least one of a rotational speed, a voltage, and a current of the electric motor.

In an example, the controller 23 is further configured to, when the operating parameter is within a preset parameter range, determine that the electric motor 19 is overloaded.

Specifically, in a running process of the electric motor 19, the operating parameter of the electric motor 19 may be detected in real time. In the case where the electric motor 19 is overloaded, the rotational speed of the electric motor 19 significantly decreases while the voltage or current of the electric motor 19 significantly increases. Therefore, different operating parameters correspond to different preset parameter ranges. The detected operating parameter may be compared with a corresponding preset parameter range so that an overload condition of the electric motor 19 is detected. For example, when operating parameters detected by the parameter detection device 25 include at least two of the rotational speed, the voltage, and the current, it is determined that the electric motor 19 is overloaded when any one of the operating parameters is within the preset parameter range.

Figure 4:
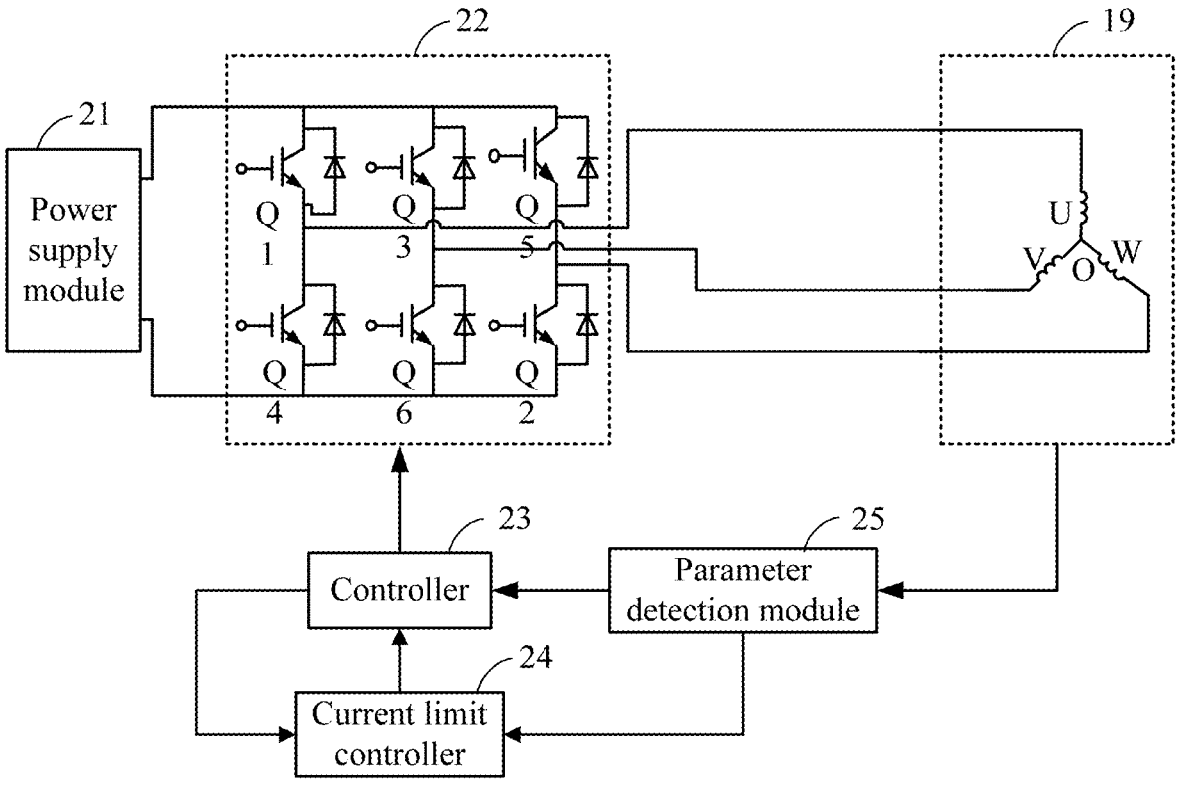
FIG. 4 is another block diagram of circuitry of a power tool according to the present application.

Optionally, FIG. 4 is another block diagram of circuitry of a power tool according to the present application. As shown in FIG. 4, the power tool further includes a current limit controller 24. The controller 23 is further configured to, when the electric motor 19 is overloaded, select a given current limit value of the current limit controller 24 according to a relevant parameter of the electric motor 19 and adjust, according to the given current limit value, the current limit value supplied to the electric motor 19.

The current limit controller 24 receives a given current value from the controller 23 on the one hand and acquires a present current value of the electric motor 19 on the other hand. The relevant parameter may include an actual rotational speed of the electric motor 19 under a present overload condition and/or the duration for which a present rotational speed is maintained. According to the relevant parameter of the electric motor 19, the overload degree of the electric motor 19 may be determined. Thus, the given current limit value supplied to the current limit controller 24 may be determined according to the overload degree of the electric motor 19. When the electric motor 19 is overloaded, the difference between the given current limit value and the present current value of the electric motor 19 may be used as the current limit value supplied to the electric motor 19. Alternatively, the difference between the given current limit value and a present bus current value of the driver circuit 22 may be used as the current limit value supplied to the electric motor 19. Thus, a duty cycle of each switching element in the driver circuit 22 is controlled so that the current value of the electric motor 19 approaches or is less than the current limit value. Accordingly, the electric motor 19 can reduce the current to a safe range in a short time in the case of the overload.

For example, referring to FIG. 4, when the power tool includes both the current limit controller 24 and the parameter detection device 25, the parameter detection device 25 may be connected to the current limit controller 24. In this case, the parameter detected by the parameter detection device 25 includes at least the rotational speed of the electric motor.

In an example, the controller 23 is further configured to, in the process where the driver circuit 22 is controlled in the first control mode and at the time when a voltage frequency of the electric motor 19 or a current frequency of the electric motor 19 is greater than a first frequency threshold, control the driver circuit 22 in a second control mode so as to cause the voltage of the electric motor 19 to vary in a square wave with the rotor position of the electric motor 19.

Specifically, in the process where the driver circuit 22 is controlled in the first control mode so that it is ensured that the electric motor 19 runs with low torque in the case of the overload, the voltage frequency of the electric motor 19 or the current frequency of the electric motor 19 may be determined according to a collected voltage of the electric motor 19 in real time. This configuration aims to detect a load condition of the electric motor according to the voltage frequency or the current frequency. The method for detecting the load condition of the electric motor according to the voltage frequency is the same as the method for detecting the load condition of the electric motor according to the current frequency. The voltage frequency is used as an example. When the voltage frequency is greater than a first frequency threshold, it is indicated that the voltage frequency has been out of a stall range and reached a normal range, which indicates that the rotational speed of the electric motor has returned to normal in this case. Therefore, it can be determined that the electric motor 19 has been unloaded. In this case, the driver circuit 22 may be controlled in the second control mode so that the electric motor 19 is controlled to gradually increase the rotational speed after being unloaded. The second control mode may be a square wave control mode. When the driver circuit 22 is controlled in the second control mode, the voltage of the electric motor varies in the square wave with the rotor position of the electric motor so that the electric motor 19 working normally is controlled. Thus, the electric motor 19 outputs torque normally.

In an example, the controller 23 is further configured to, in the process where the driver circuit 22 is controlled in the second control mode and at the time when the voltage frequency of the electric motor 19 or the current frequency of the electric motor 19 is less than a second frequency threshold, control the driver circuit 22 in the first control mode.

Specifically, in the process where the electric motor 19 runs normally, the overload condition of the electric motor 19 may also be detected according to the voltage frequency of the electric motor or the current frequency of the electric motor. When the voltage frequency or the current frequency is less than the second frequency threshold, it is indicated that the rotational speed of the electric motor 19 is excessively low, and it can be determined that the electric motor 19 is overloaded and stalls. In this case, the first control mode may be used again for controlling the driver circuit 22. Before the first control mode may be used again for controlling the driver circuit 22, the current limit value of the electric motor 19 may be adjusted so that the current of the electric motor is reduced.

In an example, the rotor position of the electric motor 19 may be detected through the injection of a high-frequency signal when the driver circuit 22 is controlled in the first control mode. The injection of the high-frequency signal refers to the injection of a high-frequency current signal or a high-frequency voltage signal into the electric motor 19. Due to saliency of the rotor, a response signal of a high-frequency voltage or a response signal of a high-frequency current includes the information about a position angle of the rotor. Based on this, the rotor position of the electric motor can be accurately detected. Thus, the electric motor 19 can be controlled according to the rotor position to continuously output torque so that the electric motor 19 does not stall and shut down.

Figure 5:
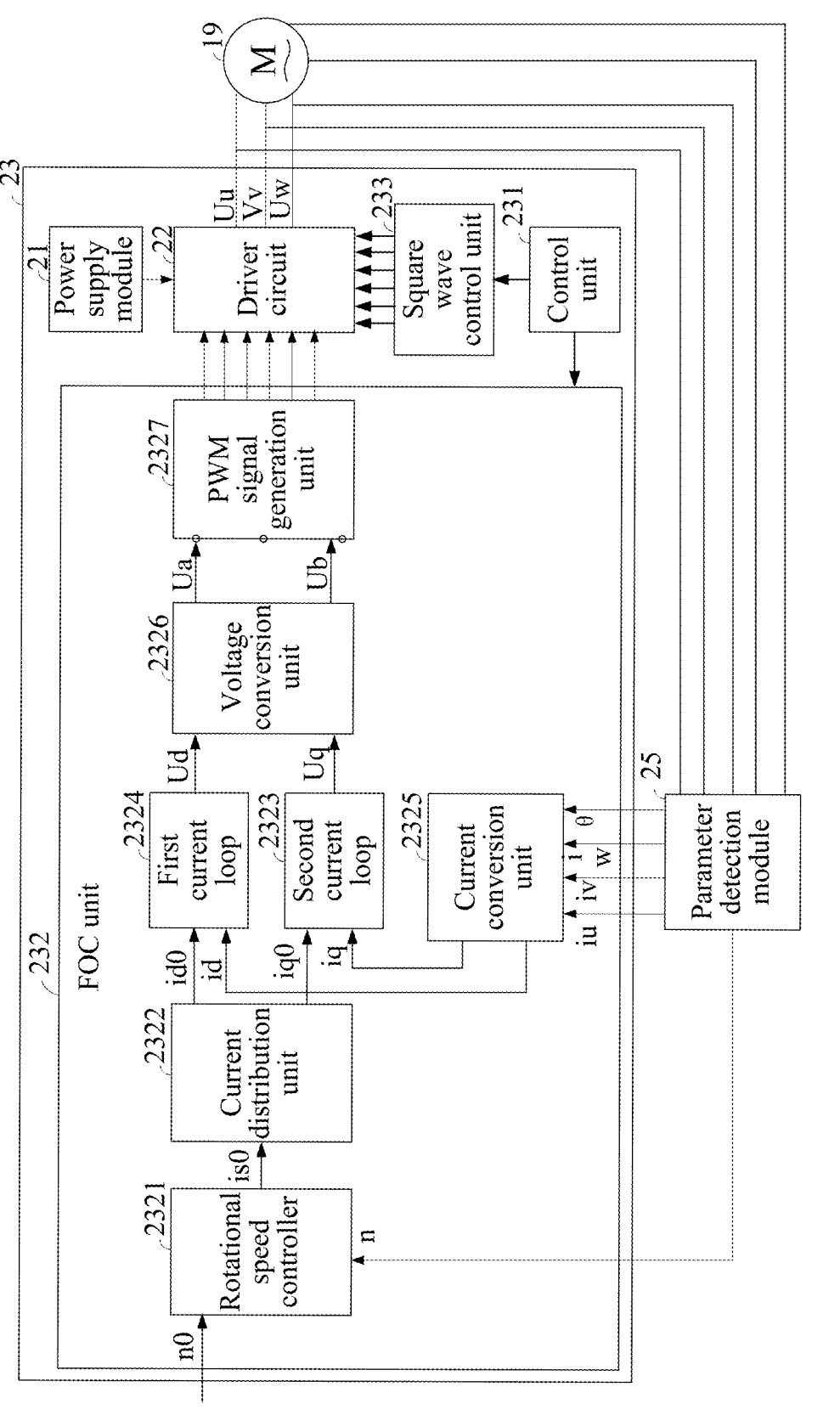
FIG. 5 is another block diagram of circuitry of a power tool according to the present application.

For example, FIG. 5 is another block diagram of circuitry of a power tool according to the present application. As shown in FIG. 5, the controller 23 includes a control unit 231, an FOC unit 232, and a square wave control unit 233. The control unit 231 is electrically connected to the FOC unit 232 and the square wave control unit 233 separately. Additionally, the FOC unit 232 and the square wave control unit 233 are each electrically connected to the gate of each switching unit of the driver circuit 22. When the driver circuit 22 is controlled in the first control mode, the control unit 231 outputs a corresponding control signal to the FOC unit 232 to cause the FOC unit 232 to run while the square wave control unit 233 outputs no square wave signal. In this case, the voltage of the electric motor 19 varies in the quasi-sine wave such as the sine wave or the saddle wave with the rotor position of the electric motor. When the driver circuit 22 is controlled in the second control mode, the control unit 231 outputs a corresponding control signal to the square wave control unit 233 to cause the square wave control unit 233 to run while the FOC unit 232 outputs no FOC signal. In this case, the voltage of the electric motor 19 varies in the square wave with the rotor position of the electric motor.

The FOC unit 232 may include a rotational speed controller 2321, a current distribution unit 2322, a quadrature-axis controller 2323, a direct-axis controller 2324, a current conversion unit 2325, a voltage conversion unit 2326, and a PWM signal generation unit 2327. When the driver circuit 22 is controlled in the first control mode, the rotational speed controller 2321 generates a target current $is0$ according to a target rotational speed $n0$ and an actual rotational speed $n$ of the electric motor 19. The current distribution unit 2322 distributes the target current $is0$ into a direct-axis target current $id0$ and a quadrature-axis target current $iq0$. The current conversion unit 2325 can convert the actual current of the electric motor 19 and a rotor position $\theta$ into a direct-axis actual current $id$ and a quadrature-axis actual current $iq$. Thus, the direct-axis controller 2324 can generate a direct-axis voltage $Ud$ according to the direct-axis target current $id0$ and the direct-axis actual current $id$, and the quadrature-axis controller 2323 can generate a quadrature-axis voltage $Uq$ according to the quadrature-axis target current $iq0$ and the quadrature-axis actual current $iq$. Thus, the voltage conversion unit 2326 converts the direct-axis voltage $Ud$ and the quadrature-axis voltage $Uq$ into intermediate voltages $Ua$ and $Ub$. Then, the PWM signal generation unit 2327 generates PWM signals according to the intermediate voltages $Ua$ and $Ub$ to control the switching elements in the driver circuit 22 so that the voltage of the electric motor varies in the quasi-sine wave with the rotor position.

In an example, the controller 23 is further configured to, when the electric motor 19 is overloaded, control an input current of the quadrature-axis controller 2323 to be a pulsed current.

Specifically, the quadrature-axis current and the electric motor 19 affect the output torque of the electric motor 19. When the electric motor 19 is overloaded, the input current (that is, the quadrature-axis target current $iq0$) of the quadrature-axis controller 2323 is controlled to be the pulsed current. Thus, the output torque of the electric motor 19 can be outputted in a pulsed manner. Accordingly, the power tool is caused to vibrate and can make the user perceive the vibration of the power tool. Thus, the user can be reminded that the power tool is in an overloaded state in this case. The user can unload the power tool in time to cause the electric motor to return to a normal rotational speed without having to operate a switch to restart the electric motor.

Figure 6:
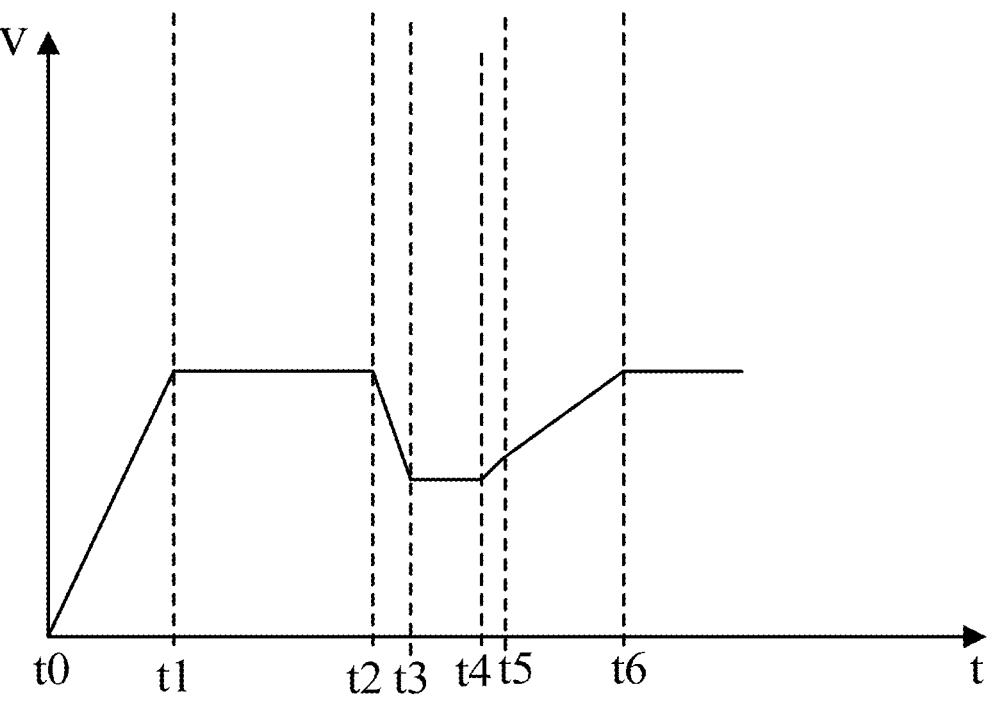
FIG. 6 shows a set variation curve.

In an example, the controller 23 is further configured to, when the electric motor 19 is unloaded, control the rotational speed of the electric motor 19 to vary according to a set variation curve. FIG. 6 shows the set variation curve. As shown in FIG. 6, the stage from t0 to t1 is a soft start process during a normal startup (that is, the startup that is performed by the user by operating the switch). In this process, the rotational speed of the electric motor gradually increases. The stage from t1 to t2 is the process where the electric motor works normally. The figure exemplarily shows that the electric motor has a constant rotational speed in the stage from t1 to t2. It is to be understood that the electric motor may have a non-constant rotational speed in the stage from t1 to t2 in other examples. In the stage from t2 to t3, the rotational speed of the electric motor decreases due to the overload. Until the occasion t3, the controller recognizes that the electric motor is overloaded. In the stage from t3 to t4, the input current of the quadrature-axis controller is controlled to be the pulsed current so that the electric motor vibrates. The electric motor starts being unloaded until the occasion t4. At the occasion t5, the controller recognizes that the electric motor has been unloaded, and it is considered that the electric motor can be controlled to return to the normal rotational speed. The stage from t5 to t6 is a soft start process after the electric motor is unloaded. Until the occasion t6, the electric motor reaches the normal rotational speed and runs normally. That is, when the electric motor is unloaded, the rotational speed of the electric motor can be controlled according to the set variation curve after the occasion t5. The variation curve in the soft start process in the stage from t5 to t6 after the electric motor is unloaded may be the same as or different from the variation curve in the soft start process during the normal startup in the stage from t0 to t1, which is not specifically limited in the present application.

It is to be understood that the driver circuit 22 may be controlled in the second control mode in the stage from t1 to t3 so that the voltage of the electric motor varies in the square wave with the rotor position of the electric motor. In the overload stage from t3 to t5, the driver circuit 22 may be controlled in the first control mode so that the voltage of the electric motor varies in the quasi-sine wave with the rotor position of the electric motor. After it is determined, until the occasion t5, that the electric motor is unloaded, the driver circuit 22 may be controlled in the second control mode so that the voltage of the electric motor varies in the square wave with the rotor position of the electric motor.

Based on the same inventive concept, the present application further provides a power tool. The specific structure of the power tool may be the same as the specific structure of the power tool in the preceding example. Referring to FIGS. 1, 2, and 3, the power tool includes a functional element 11 and an electric motor 19 including a stator and a rotor and configured to drive the functional element 11 to rotate. The power tool further includes a power supply module 21 configured to supply power to the electric motor 19, a driver circuit 22 electrically connected to the electric motor 19 and the power supply module 21 and configured to apply a voltage of the power supply module 21 to the electric motor 19, and a controller 23 electrically connected to the driver circuit 22 and configured to output a control signal to the driver circuit 22. In this example, the controller 23 is configured to, when the electric motor 19 is overloaded, control the driver circuit 22 in a first control mode so as to cause a voltage of the electric motor to vary in a quasi-sine wave with a rotor position of the electric motor 19 and inject a high-frequency signal to detect the rotor position.

Specifically, in the case where the electric motor 19 is overloaded, the first control mode can be used in time for controlling the driver circuit 22. In addition, the high-frequency signal is injected so that the rotor position is detected. Thus, the electric motor 19 can be controlled according to the rotor position to continuously output torque so that the electric motor 19 does not stall and shut down. In this process, the voltage of the electric motor 19 varies in the quasi-sine wave with the rotor position of the electric motor 19. Accordingly, the electric motor 19 can maintain low-torque output without shutting down in the case of an overload. Thus, the user's operational procedures can be reduced, thereby effectively improving the user experience.

In an example, the quasi-sine wave includes a sine wave or a saddle wave.

Referring to FIG. 3, in an example, the controller 23 is further configured to, in the process where the driver circuit is controlled in the first control mode and at the time when a voltage frequency of the electric motor 19 or a current frequency of the electric motor 19 is greater than a first frequency threshold, control the driver circuit 22 in a second control mode so as to cause the voltage of the electric motor to vary in a square wave with the rotor position of the electric motor.

In an example, the controller 23 is further configured to, in the process where the driver circuit is controlled in the second control mode and at the time when the voltage frequency of the electric motor 19 or the current frequency of the electric motor 19 is less than a second frequency threshold, control the driver circuit 22 in the first control mode.

In an example, the controller may switch the control mode of the driver circuit according to the temperature of the electric motor. Based on the inventive concept, the present application further provides a power tool. The main structure of the power tool may be the same as the main structure of the power tool in the preceding example. Referring to FIGS. 1 and 2, the power tool includes a functional element 11 and an electric motor 19 including a stator and a rotor and configured to drive the functional element 11 to rotate. In this example, the electric motor 19 is a sensorless motor, that is, an electric motor without any position sensor.

Figure 7:
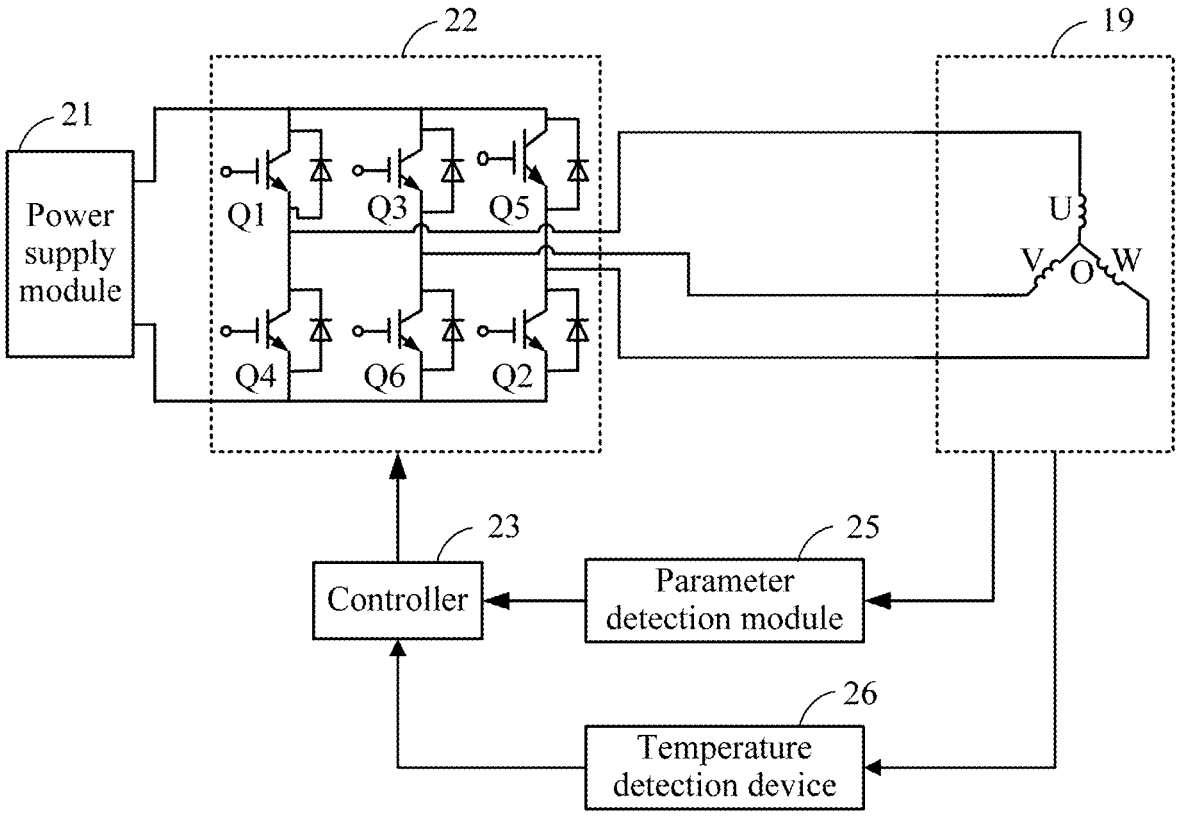
FIG. 7 is another block diagram of circuitry of a power tool according to the present application.

FIG. 7 is another block diagram of circuitry of a power tool according to the present application. As shown in FIG. 7, the power tool further includes a power supply module 21 configured to supply power to the electric motor 19, a driver circuit 22 electrically connected to the electric motor 19 and the power supply module 21 and configured to apply a voltage of the power supply module 21 to the electric motor 19, a temperature detection device 26 configured to detect the temperature inside the power tool, and a controller 23 electrically connected to the driver circuit 22 and configured to output a control signal to the driver circuit 22. In this example, the controller 23 is configured to, in the case where the temperature is lower than a temperature threshold, control the driver circuit 22 in a third control mode so as to cause a voltage of the electric motor 19 to vary in a third wave with a rotor position of the electric motor 19; and the controller 23 is configured to, in the case where the temperature is higher than or equal to the temperature threshold, control the driver circuit in a second control mode so as to cause the voltage of the electric motor 19 to vary in a second wave with the rotor position of the electric motor 19.

The second control mode is a square wave control mode, and the third control mode may be a mode where the square wave control mode and an FOC mode are alternately switched.

Specifically, the temperature detection device 26 may be electrically and/or communicatively connected to the controller 23 and transmit the detected temperature to the controller 23 in real time. The controller 23 may compare, in real time, the temperature provided by the temperature detection device 26 with the temperature threshold. When the temperature is higher than or equal to the temperature threshold, it is indicated that the present temperature of the power tool is relatively high. The FOC mode requires a relatively high-frequency modulation of a switching element in the driver circuit 22, resulting in much heat generated by the switching element. Therefore, if the third control mode including the FOC mode is used when the temperature is higher than or equal to the temperature threshold, overtemperature protection occurs in the power tool. As a result, the use time of the power tool is limited. Therefore, each switching element in the driver circuit 22 may be controlled in the second control mode when the temperature is higher than or equal to the temperature threshold. That is, the driver circuit 22 is controlled only in the square wave control mode so that an overtemperature in the electric motor 19 is prevented. In this process, the voltage of the electric motor 19 varies in the second wave with the rotor position of the electric motor 19. When the temperature is lower than the temperature threshold, it is indicated that the operating temperature of the power tool is within a normal range. In this case, each switching element in the driver circuit 22 may be controlled in the third control mode. That is, the driver circuit 22 is controlled in the mode where the square wave control mode and the FOC mode are alternately switched. In this manner, the overall efficiency of the power tool can be effectively improved. In the process where the driver circuit 22 is controlled in the third control mode, the voltage of the electric motor 19 varies in a third wave with the rotor position of the electric motor 19.

In an embodiment, in the case where the temperature is lower than the temperature threshold, the square wave control mode or the FOC mode may be specifically selected according to the duty cycle of the control signal when the driver circuit is controlled in the third control mode.

For example, in the case where the temperature is lower than the temperature threshold and the duty cycle of the control signal is less than a duty cycle threshold, the driver circuit 22 is controlled in the second control mode. In this manner, when the duty cycle is relatively small, the driver circuit 22 is controlled in the square wave control mode so that the rotor position can be detected accurately, thereby controlling the electric motor 19 precisely.

In the case where the temperature is lower than the temperature threshold and the duty cycle of the control signal is greater than or equal to the duty cycle threshold, the driver circuit 22 is controlled in the first control mode so that the voltage of the electric motor varies in a quasi-sine wave with the position of the rotor of the electric motor. Thus, the power tool can have a relatively high overall efficiency, and the improvement of the overall efficiency of the power tool is facilitated. In this manner, in the case where the temperature is lower than the temperature threshold, the square wave control mode and the FOC mode may be alternately switched according to the duty cycle of the control signal.

The power tool provided in the example of the present application selects the control mode of the driver circuit according to the temperature of the power tool. In the case where the temperature is lower than the temperature threshold, the driver circuit is controlled in the third control mode so that the voltage of the electric motor varies in the third wave with the rotor position of the electric motor. In the case where the temperature is higher than or equal to the temperature threshold, the driver circuit is controlled in the second control mode so that the voltage of the electric motor varies in the second wave with the rotor position of the electric motor. The efficiency and temperature rise performance of the electric motor can be effectively improved.

In an example, when the driver circuit 22 is controlled in the third control mode, the third wave presented by the voltage of the electric motor 19 includes a square wave, or the third wave includes a wave in which a square wave and the quasi-sine wave appear alternately.

In an example, the quasi-sine wave includes at least one of a sine wave and a saddle wave.

In an example, the control mode of the driver circuit 22 may be selected in conjunction with the temperature of the power tool and the duty cycle of the control signal supplied by the controller 23 to the driver circuit 22.

Based on the inventive concept, the present application provides a power tool. The main structure of the power tool may be the same as the main structure of the power tool in the preceding example. Referring to FIGS. 1, 2, and 7, the power tool includes a functional element 11, an electric motor 19 including a stator and a rotor and configured to drive the functional element 11 to rotate, a temperature detection device 26 configured to detect the temperature inside the power tool, and a controller 23 electrically connected to the driver circuit 22 and configured to output a control signal to the driver circuit 22. The temperature detected by the temperature detection device 26 may include at least one of the temperature of the electric motor 19, the temperature of a power element in the driver circuit 22, and the temperature of a control board in the power tool.

In this example, the controller 23 is configured to determine, according to the temperature and a duty cycle of the control signal, the control mode in which the driver circuit 22 is controlled. This configuration aims to cause the voltage of the electric motor 19 to vary with the rotor position of the electric motor 19 in a wave corresponding to the control mode so that the efficiency and temperature rise performance of the electric motor can be effectively improved.

For example, the controller 23 is further configured to, when the temperature is lower than a temperature threshold, determine, according to the duty cycle, the control mode in which the driver circuit 22 is controlled. This configuration aims to cause the voltage of the electric motor 19 to vary with the rotor position of the electric motor 19 in the wave corresponding to the control mode.

In an example, the controller 23 is further configured to, in the case where the temperature is lower than the temperature threshold and at the time when the duty cycle of the control signal is less than a duty cycle threshold, control the driver circuit 22 in a second control mode. In this manner, when the duty cycle is relatively small, the driver circuit 22 is controlled in a square wave control mode so that the rotor position can be detected accurately, thereby controlling the electric motor 19 precisely.

In an example, the controller 23 is further configured to, in the case where the temperature is lower than the temperature threshold and at the time when the duty cycle of the control signal is greater than or equal to the duty cycle threshold, control the driver circuit 22 in a first control mode so as to cause the voltage of the electric motor 19 to vary in the quasi-sine wave with the position of the rotor of the electric motor 19. Thus, the power tool can have a relatively high overall efficiency, and the improvement of the overall efficiency of the power tool is facilitated. In this manner, in the case where the temperature is lower than the temperature threshold, the square wave control mode and the FOC mode may be alternately switched according to the duty cycle of the control signal.

Figure 8:
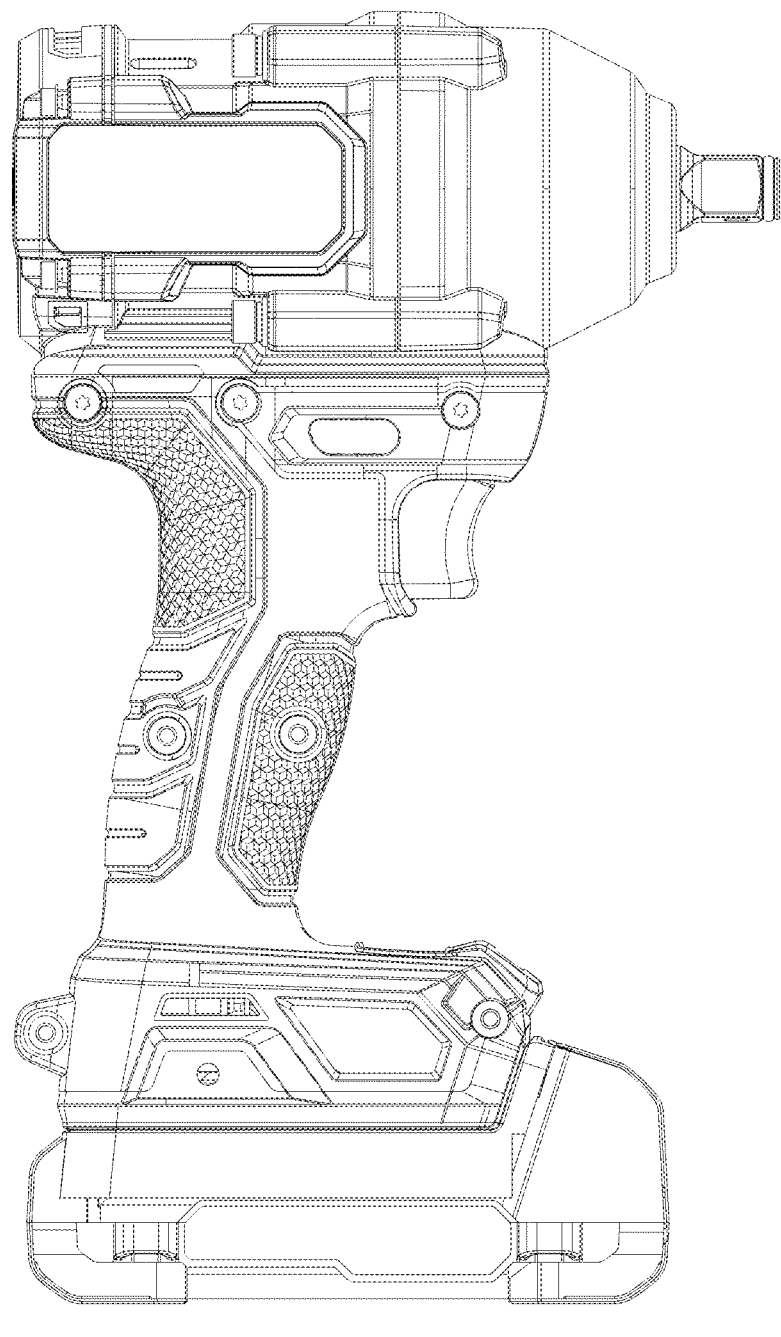
FIG. 8 is a structural view of another power tool according to the present application.

It is to be noted that in the preceding examples, exemplary descriptions and explanations are performed only using the example in which the power tool is an angle grinder. Other types of power tools which can adopt the substance of the technical solutions disclosed below may fall within the scope of the present application. For example, the hammer anvil shown in FIG. 8 is also a type of power tool protected by the present application. The present invention does not specifically limit the type of power tool.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A power tool, comprising:
a functional element;
an electric motor, comprising a stator and a rotor, configured to drive the functional element to rotate;
a power supply module configured to supply power to the electric motor;
a driver circuit, electrically connected to the electric motor and the power supply module, configured to apply a voltage of the power supply module to the electric motor;
a temperature detection device configured to detect a temperature inside the power tool; and
a controller, electrically connected to the driver circuit, configured to output a control signal to the driver circuit, when the temperature is higher than or equal to a temperature threshold, control the driver circuit in a first control mode so as to cause a voltage of the electric motor to vary in a first wave with a rotor position of the electric motor, and, when the temperature is lower than the temperature threshold, control the driver circuit in a second control mode so as to cause the voltage of the electric motor to vary in a second wave with the rotor position of the electric motor, wherein the second wave comprises a square wave and a quasi-sine wave that appear alternately.

2. The power tool according to claim 1, wherein the quasi-sine wave comprises at least one of a sine wave and a saddle wave.

3. The power tool according to claim 1, wherein the controller is further configured to, when the temperature is lower than the temperature threshold and a duty cycle of the control signal is less than a duty cycle threshold, control the driver circuit in the first control mode.

4. The power tool according to claim 1, wherein the controller is further configured to, when the temperature is lower than the temperature threshold and a duty cycle of the control signal is greater than or equal to a duty cycle threshold, control the driver circuit in a third control mode so as to cause the voltage of the electric motor to vary in the quasi-sine wave with the position of the rotor of the electric motor.

5. The power tool according to claim 1, wherein the electric motor is a sensorless motor.

6. A control method of a power tool comprising a functional element, an electric motor, comprising a stator and a rotor, configured to drive the functional element to rotate, a power supply module configured to supply power to the electric motor, a driver circuit, electrically connected to the electric motor and the power supply module, configured to apply a voltage of the power supply module to the electric motor, a temperature detection device configured to detect a temperature inside the power tool, and a controller, electrically connected to the driver circuit, configured to output a control signal to the driver circuit, the control method comprising:
when the temperature is higher than or equal to a temperature threshold, controlling the driver circuit in a first control mode so as to cause a voltage of the electric motor to vary in a first wave with a rotor position of the electric motor; and
when the temperature is lower than the temperature threshold, controlling the driver circuit in a second control mode so as to cause the voltage of the electric motor to vary in a second wave with the rotor position of the electric motor; wherein the second wave comprises a square wave and a quasi-sine wave that appear alternately.

7. The control method according to claim 6, wherein the quasi-sine wave comprises at least one of a sine wave and a saddle wave.

8. The control method according to claim 6, further comprising: when the temperature is lower than the temperature threshold and a duty cycle of the control signal is less than a duty cycle threshold, controlling the driver circuit in the first control mode.

9. The control method according to claim 6, further comprising: when the temperature is lower than the temperature threshold and a duty cycle of the control signal is greater than or equal to a duty cycle threshold, controlling the driver circuit in a third control mode so as to cause the voltage of the electric motor to vary in the quasi-sine wave with the position of the rotor of the electric motor.

* * * * *